United States Patent [19]
Su

[11] Patent Number: 5,545,096
[45] Date of Patent: Aug. 13, 1996

[54] SPROCKET MECHANISM FOR A MULTISTAGE BICYCLE

[76] Inventor: Bor-Lin Su, No. 70, Sec. 1, Tian-Shin Road, Feng-Yuan City, Taichung Hsien, Taiwan

[21] Appl. No.: 520,598

[22] Filed: Aug. 29, 1995

[51] Int. Cl.⁶ ............................................. F16H 55/30
[52] U.S. Cl. ............................................. 474/160
[58] Field of Search ................... 474/152, 153, 474/160, 164

[56] References Cited

U.S. PATENT DOCUMENTS

| | | | |
|---|---|---|---|
| 536,813 | 4/1895 | Macphall et al. | 474/152 |
| 619,537 | 2/1899 | Bufford | 474/156 |
| 1,583,221 | 5/1926 | Carlson | 474/156 |
| 3,478,614 | 11/1969 | Shimano | 474/160 |
| 3,498,148 | 3/1970 | Gerbasi et al. | 474/154 |
| 3,756,091 | 9/1973 | Miller | 474/153 |
| 3,772,932 | 11/1973 | Nagano | 474/160 |
| 3,956,943 | 5/1976 | Yamasaki | 474/160 X |
| 4,018,095 | 4/1977 | Shimano | 474/160 X |
| 4,268,259 | 5/1981 | Segawa et al. | 474/160 |
| 4,330,286 | 5/1982 | Nagano | 474/164 |
| 4,384,865 | 5/1983 | Ueno | 474/162 X |
| 4,521,207 | 6/1985 | Husted | 474/164 X |
| 4,773,893 | 9/1988 | Su et al. | 474/160 X |
| 4,813,916 | 3/1989 | Valin | 474/152 |
| 4,889,521 | 12/1989 | Nagano | 474/164 |
| 5,133,695 | 7/1992 | Kobayashi | 474/160 |
| 5,192,249 | 3/1993 | Nagano | 474/160 |
| 5,514,042 | 5/1996 | Liou | 474/160 |

*Primary Examiner*—Roger J. Schoeppel
*Attorney, Agent, or Firm*—Morton J. Rosenberg; David I. Klein

[57] ABSTRACT

A sprocket mechanism is provided. The sprocket mechanism includes two or more sprockets each having two groups of teeth formed in the peripheral portion and having another tooth formed between the two groups of teeth. The tooth disposed between the two groups of teeth has a smaller height than the other teeth, and has a straight and tapered surface for facilitating the shifting of the driving chain between the sprockets. The teeth of one of the groups of teeth each includes a pair of diagonal areas, each diagonal area having a tapered cutout portion for preventing the driving chain from shifting between the teeth of that group on each of the sprockets.

2 Claims, 4 Drawing Sheets

SPROCKET MECHANISM FOR A MULTISTAGE BICYCLE

BACKGROUND OF THE INVENTION

1. Field of the Invention

The present invention relates to a sprocket, and more particularly to a sprocket mechanism multistage bicycle.

2. Description of the Prior Art

Typical multistage sprocket mechanisms are mounted on a crank or a rear hub of a bicycle and comprise a number of sprockets for engaging with a driving chain and spaced from each other at a predetermined interval. In order to facilitate the shifting of the driving chain from one of the sprockets to the other sprocket, various kinds of ideas have been developed to improve the same. The prior multistage sprocket mechanisms comprise: U.S. Pat. No. 536,813 to Macphail et al.; U.S. Pat. No. 619,537 to Bufford; U.S. Pat. No. 1,583,221 to Carlson; U.S. Pat. No. 3,478,614 to Shimano; U.S. Pat. No. 3,498,148 to Gerbasi et al.; U.S. Pat. No. 3,756,091 to Miller; U.S. Pat. No. 3,772,932 to Nagano; U.S. Pat. No. 3,956,943 to Yamasaki; U.S. Pat. No. 4,018,095 to Shimano; U.S. Pat. No. 4,268,259 to Segawa et al.; U.S. Pat. No. 4,330,286 to Nagano; U.S. Pat. No. 4,521,207 to Husted; U.S. Pat. No. 4,773,893 to Su et al.; U.S. Pat. No. 4,813,916 to Valin; U.S. Pat. No. 4,889,521 to Nagano; and U.S. Pat. No. 5,133,695 to Kobayashi. Some of the prior arts comprise a number of teeth having recesses formed in the side portions for engaging with the chains so as to facilitating the shifting of the driving chain. In U.S. Pat. No. 4,889,521 to Nagano, the sprockets each includes one side having a number of recesses formed thereon and extended beyond the teeth so as to form chain guide portions for engaging with the driving chain and for facilitating the engagement of the driving chain with the sprockets and for preventing the driving chain from engaging with the other sprockets. However, the teeth include different directions such that the teeth may not be easily manufactured.

The present invention has arisen to mitigate and/or obviate the afore-described disadvantages of the conventional multistage sprocket mechanisms.

SUMMARY OF THE INVENTION

The primary objective of the present invention is to provide a sprocket which includes chain guide portions formed on both sides thereof so as to prevent the driving chain from engaging with the previous sprocket after shifted from the previous sprocket to the following sprocket.

In accordance with one aspect of the invention, there is provided a sprocket mechanism for engaging with a driving chain of a bicycle, the sprocket mechanism comprises at least two sprockets, the sprockets each including a peripheral portion having at least one first group of teeth and at least one second group of teeth alternatively formed thereon and at least one first tooth formed between the first group of teeth and the second group of teeth, the first group of teeth including at least two second teeth arranged in series, the second group of teeth including at least two third teeth arranged in series, the sprockets each including a first surface having at least one recess formed therein, the recess being formed beside the third teeth and extending for a length of a width of the two third teeth, and the first tooth including a height smaller than that of the second teeth and that of the third teeth for facilitating shifting of the driving chain between the sprockets.

The first tooth includes a straight and tapered surface facing toward the third teeth for facilitating shifting of the driving chain between the sprockets.

The third teeth each includes a pair of diagonal areas, the diagonal areas each includes a tapered cutout portions for facilitating shifting of the driving chain between the sprockets and for preventing the driving chain from shifting between the third teeth of the sprockets.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
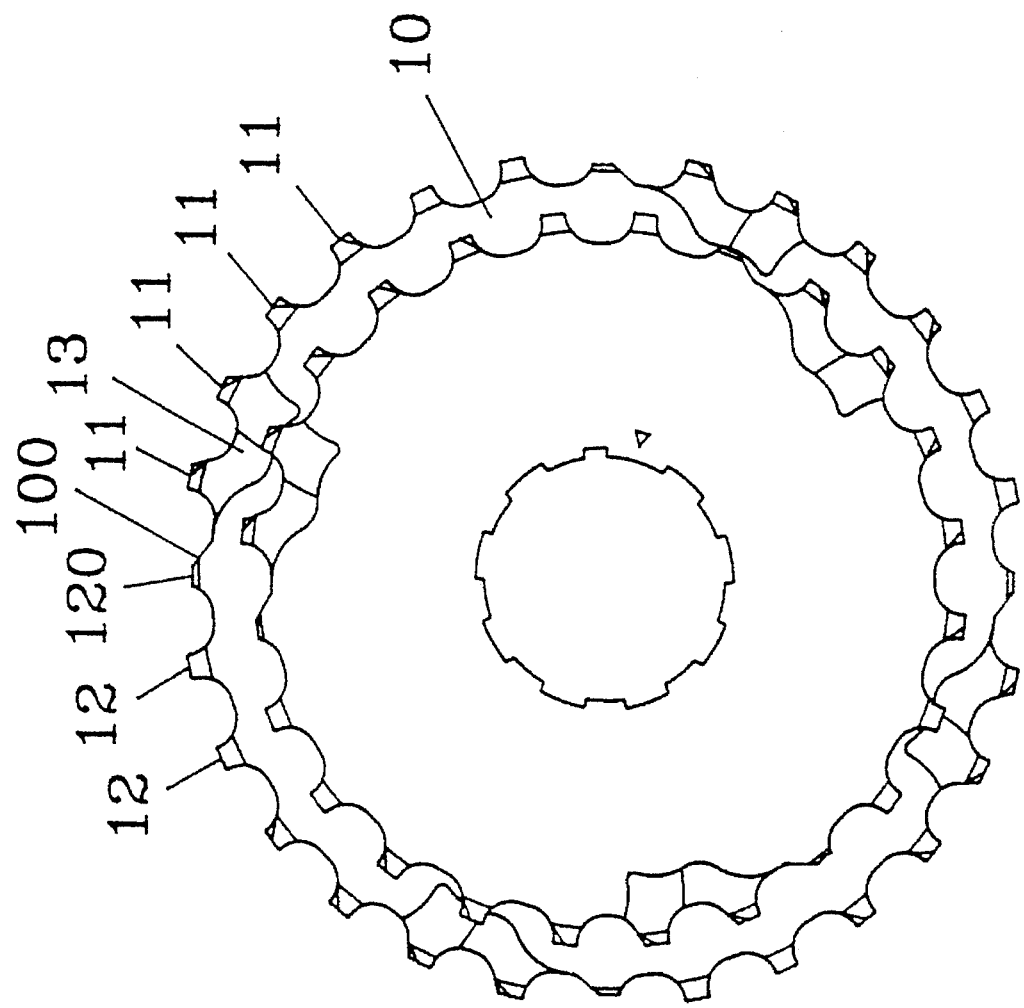
FIG. 1 is a plane view of a sprocket mechanism in accordance with the present invention.
Figure 2:
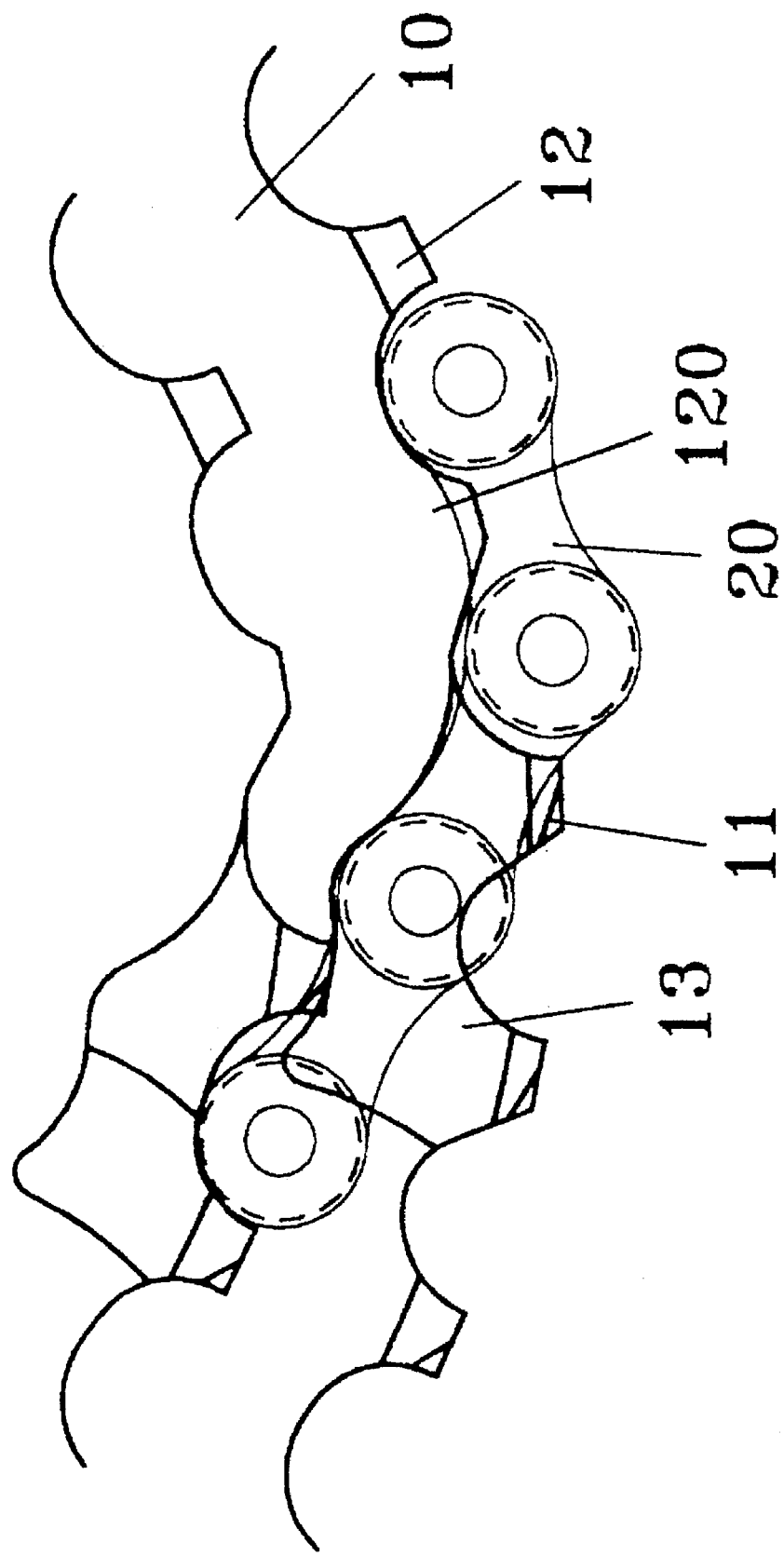
FIG. 2 is an enlarged plane view showing the engagement of the chain with the sprockets.
Figure 3:
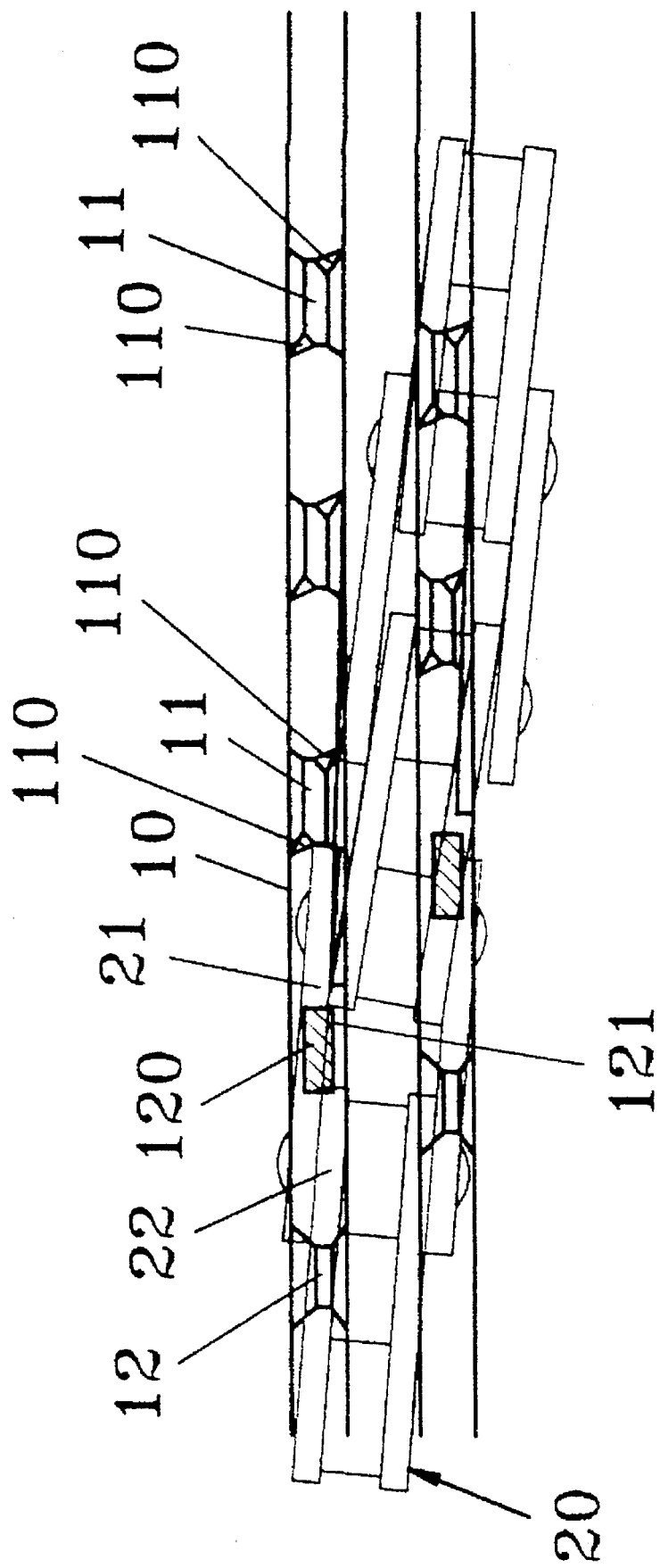
FIGS. 3 and 4 are partial top views illustrating the engagement of the chain with the sprockets.

Referring to the drawings, and initially to FIGS. 1 to 3, a sprocket mechanism for a bicycle in accordance with the present invention is mounted on a crank or a rear hub of a bicycle and comprises two or more sprockets 10 for engaging with a driving chain 20 and spaced from each other at a predetermined interval. The sprocket 10 comprises a front surface and a rear surface and comprise a peripheral portion having a number of teeth 11, 12, 120 alternatively formed thereon. It is preferable that a first group of about four teeth 11 are arranged close to each other, and a second group of about two teeth 12 are arranged close to each other, and another tooth 120 is arranged between the two groups of teeth 11, 12.

The front surface of the sprocket 10 includes a peripheral portion having two or more recesses 13 formed therein for engaging with the link plates of the typical driving chain 20. The recesses 13 each extends for a length of the width of two teeth 11. The tooth 120 is arranged beside the recess 13 and includes a height smaller than that of the other teeth 11, 12 such that the driving chain 20 may be swiftly engaged with the tooth 120 and can be easily shifted from one to the other of the sprockets 10. In addition, the tooth 120 includes a straight and tapered surface 100 facing toward the teeth 11 so as to further facilitate the engagement of the driving chain 20 with the tooth 120. The teeth 11 each includes a pair of diagonal areas each having a tapered cutout portion 110 formed therein for preventing the driving chain 20 from shifting from the teeth 11 to the teeth 11 of the other sprockets. It is to be noted that the arrangement of the tapered cutout portions 110 allows the sprockets 10 to be easily manufactured.

Figure 4:
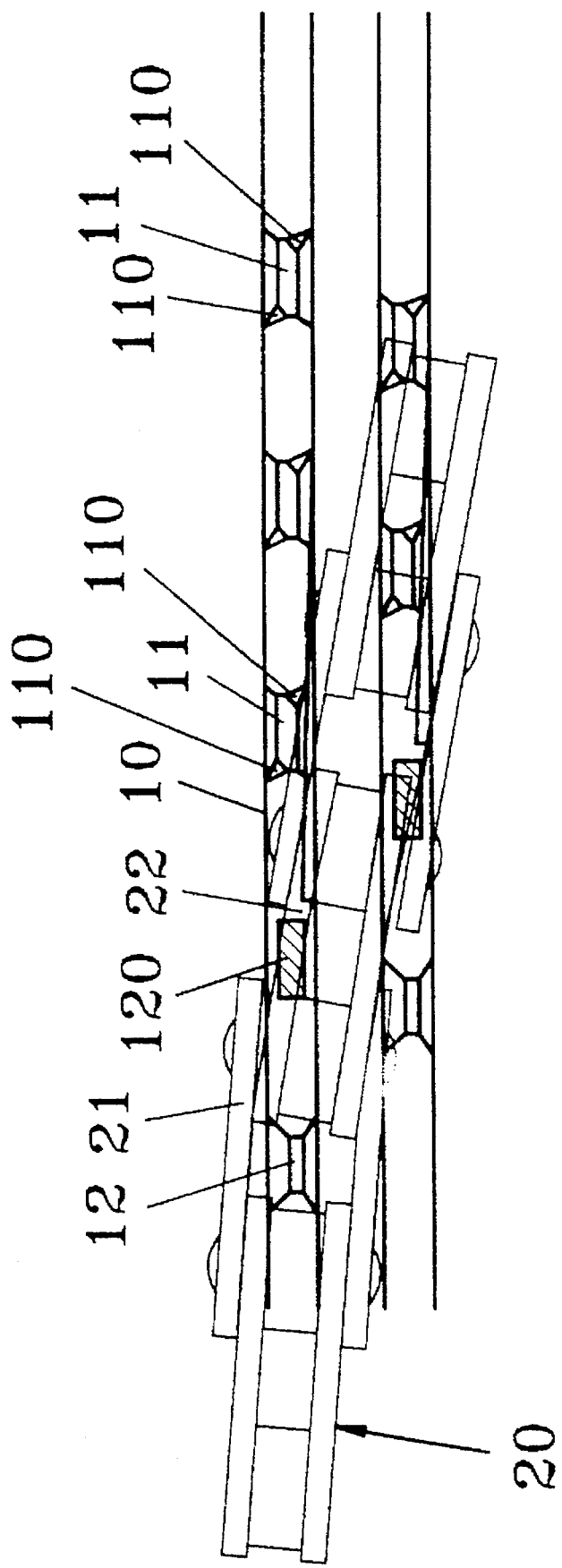

Referring next to FIG. 4, the inner link plates 22 may engage over the teeth 120 for engaging with the teeth 11 of the other sprocket 10, such that the smaller height of the teeth 120 may facilitate the shifting of the driving chain 20 from one of the sprockets 10 to the other sprocket 10. As shown in FIG. 3, the outer link plates 22 may also engage over the teeth 120 for engaging with the teeth 11 of the other sprocket 10, such that the smaller height of the teeth 120 may facilitate the shifting of the driving chain 20 from one of the sprockets 10 to the other sprocket 10.

Accordingly, the sprocket mechanism in accordance with the present invention includes a sprocket having a special tooth 120 and having a number of special teeth 11 for facilitating the shifting of the driving chain.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sprocket mechanism for engagement with a driving chain of a bicycle, said sprocket mechanism comprising:

at least two sprockets, each of said sprockets having a peripheral portion on which is formed at least one set of teeth defined by (1) a first group of teeth, said first group of teeth being defined by a plurality of sequentially arranged teeth of a first style, (2) a second group of teeth, said second group of teeth being defined by a plurality of sequentially arranged teeth of a second style, and (3) a tooth of a third style disposed between said first and second groups, each said sprocket having at least one recess formed in a side surface thereof adjacent said peripheral portion, said recess being disposed adjacent said first group of teeth and extending for a distance substantially equal to a width dimension of two consecutive teeth of said first group of teeth, said tooth of said third style having a height dimension less than a height dimension of both said teeth of said first style and said teeth of said second style for facilitating shifting of the driving of a bicycle between said at least two sprockets.

2. The sprocket mechanism as recited in claim 1, where said tooth of said third style includes a straight and tapered surface facing toward said first group of teeth for facilitating shifting of the driving chain between said at least two sprockets.

* * * * *